United States Patent
Dole

(10) Patent No.: US 7,543,857 B2
(45) Date of Patent: Jun. 9, 2009

(54) SELF-LOCKING ROLLER CAM FOR HOSE AND PIPE COUPLING

(75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 59 days.

(21) Appl. No.: 10/364,872

(22) Filed: Feb. 11, 2003

(65) Prior Publication Data
US 2003/0151252 A1  Aug. 14, 2003

Related U.S. Application Data

(60) Provisional application No. 60/356,232, filed on Feb. 12, 2002.

(51) Int. Cl.
*F16L 37/00* (2006.01)

(52) U.S. Cl. ........................ 285/312; 285/320

(58) Field of Classification Search ................. 285/311, 285/312, 314, 320, 326, 358, 394, 87, 309, 285/148.27; 292/241, 240; 16/438, 439; 384/447
See application file for complete search history.

(56) References Cited

U.S. PATENT DOCUMENTS

| | | |
|---|---|---|
| 863,903 A | 8/1907 | Chapple |
| 1,130,855 A | 3/1915 | Stotts |
| 1,175,438 A | 3/1916 | Gzupkaytie |
| 2,478,586 A * | 8/1949 | Krapp .................. 285/312 |
| 3,321,256 A * | 5/1967 | Orain .................... 384/447 |
| 3,586,350 A | 6/1971 | Ashton |
| 3,776,575 A | 12/1973 | Gilvar et al. |
| 3,865,409 A | 2/1975 | Paddington |
| 3,870,345 A | 3/1975 | Liautaud |
| 4,004,611 A | 1/1977 | Friedell |
| 4,035,044 A * | 7/1977 | Miyazaki ................ 384/447 |

(Continued)

OTHER PUBLICATIONS

"Standard Specification for Quick Disconnect Couplings", (Designation: F 1122-87 (Reapproved 1998)) Copyright © ASTM (pp. 421-432).

(Continued)

*Primary Examiner*—Aaron M Dunwoody
(74) *Attorney, Agent, or Firm*—Ballard Spahr Andrews and Ingersoll, LLP

(57) ABSTRACT

A coupling for joining conduits together is disclosed, the coupling having male and female fitting portions held in engagement by a self-locking roller cam positioned on the female portion. The roller cam has a cam body rotatable about an axis offset from the center of the cam body. An annular roller surrounds the cam body and is rotatable relatively to it. An outwardly facing surface on the roller engages an opposing concave surface on the male portion of the coupling. Reaction forces between the roller and the opposing surface operate along a line of action initially positioned to one side of the offset axis to create a torque opposing rotation of the cam into engagement with the opposing concave surface. Further forced rotation of the cam into engagement with the opposing concave surface causes the line of action of the reaction force to shift to an opposite side of the offset axis thereby creating a torque which causes rotation of the cam body into engagement with the opposing concave surface to retain the male fitting portion within the female fitting portion.

10 Claims, 6 Drawing Sheets

U.S. PATENT DOCUMENTS

| | | | |
|---|---|---|---|
| 4,131,303 A | 12/1978 | Nagasaki et al. | |
| 4,575,130 A * | 3/1986 | Pemberton et al. | 285/93 |
| 4,809,995 A | 3/1989 | Ramunas | |
| 4,909,641 A * | 3/1990 | Mc Kenzie | 384/447 |
| 5,535,984 A * | 7/1996 | Anderson et al. | 285/312 |
| 5,575,572 A * | 11/1996 | Schaede | 384/585 |
| 5,662,429 A | 9/1997 | Battocchio | |
| 5,816,623 A | 10/1998 | Chang | |
| 5,904,380 A | 5/1999 | Lee | |
| 5,911,445 A | 6/1999 | Lee | |
| 5,927,760 A | 7/1999 | Rocha | |
| 5,947,530 A | 9/1999 | Harle | |
| 5,988,693 A | 11/1999 | Street | |
| 6,015,168 A | 1/2000 | Fahl | |
| 6,047,995 A | 4/2000 | Kotake | |
| 6,089,619 A | 7/2000 | Goda | |
| 6,202,538 B1 * | 3/2001 | Scharinger et al. | 384/447 |
| 6,206,431 B1 | 3/2001 | Street | |
| 6,224,113 B1 | 5/2001 | Chien | |
| 6,412,827 B1 | 7/2002 | Barclay et al. | |
| 6,616,338 B2 * | 9/2003 | Tibbits | 384/447 |

OTHER PUBLICATIONS

"Twin-Kam® Kamlok® Couplers" by Civacon © 1992 Catalog KAM-92 (Rev. May 1992) (pp. 1-8).
"The Autolok™ Self-Locking Quick Coupler" (1 page brochure) by Civacon © 1997.
Autolok™ (1 page brochure) by Civacon © 1994.
Rite Quick Couplings, Catalogue 42 (pp. 1-11) by Ritepro Inc. (undated).

* cited by examiner

SELF-LOCKING ROLLER CAM FOR HOSE AND PIPE COUPLING

RELATED APPLICATION

This application is based on and claims the benefit of U.S. Provisional Application No. 60/356,232, filed Feb. 12, 2002.

FIELD OF THE INVENTION

The invention concerns a self-locking cam having a cam surface that rotates relatively to a cam body to reduce cam actuation force and wear between the cam and an opposing surface engaged by the cam surface. The invention is useful in quick disconnect pipe and hose couplings.

BACKGROUND OF THE INVENTION

In many industries such as mining, petroleum, construction and chemical production, as well as services such as municipal water and sewer service or emergency services, it is often advantageous to be able to rapidly construct temporary piping networks for the conveyance of pressurized fluids such as water, oil and natural gas. Since such piping networks must often be constructed in the field, with few construction facilities available, it is preferred that the piping comprising such networks be rapidly and securely connectable and disconnectable mechanically without the need for specialized tools or techniques.

To this end, mechanical couplings 10, as shown in FIG. 1, have been developed. Couplings 10 have a male fitting 12 that engages a female fitting 14, compressing a seal 15 within the female coupling. The fittings are secured to one another by one or more cams 16 mounted on the female fitting. Cams 16 comprise a cam body 18 that rotates about an axis 20 offset from the cam body. The offset axis 20 permits the cam body 18 to be rotated into and out of the female fitting 14 and forcibly engage a concave surface 22 on the male fitting 12 to compress the seal 15 and retain the male fitting within the female fitting. Rotation of the cam body is effected manually by a lever 24 that extends from the cam body. The fittings 12 and 14 may be rapidly engaged or disengaged by rotating the cam bodies into and out of engagement with the male fitting.

There are several disadvantages with prior art mechanical couplings using cams to secure fittings together. The disadvantages result from the degree of interference required between the cam body 18 and the concave surface 22 upon engagement in order to secure the fittings together in a fluid-tight fit. The interference results in significant frictional forces between the cam body and the concave surface. The friction causes wear of both the cam body and the concave surface as they move relatively to one another and also results in relatively high actuation forces being required to rotate the cams by means of the levers 24. The frictional forces and wear are further aggravated by the presence of abrasive contaminants such as sand, mud or other particles between the cams and the concave surface. The wear causes the cams and fittings to require frequent replacement, and the high actuation forces make it difficult to manually rotate the levers to engage or disengage the fittings. There is clearly a need for an improved mechanical coupling using cams that does not suffer from high wear between the relatively moving parts or require high actuation forces for engagement and disengagement.

Another disadvantage of the prior art coupling is the lack of a self-locking feature of the cams. Unless additional locking mechanisms are employed, the cams, when closed to effect the joint, are kept in the closed position only by the friction between the cam and concave surface, or by special locking pins or mechanisms designed to hold the cams in place. Under vibration or shock loads, one or more of the cams may disengage and allow leakage or separation of the pipe or hose ends unless locking features are provided.

SUMMARY AND OBJECTS OF THE INVENTION

The invention concerns a self-locking roller cam for engaging an opposing surface. The roller cam comprises a cam body having a center, the cam body being rotatable about an axis offset from the cam body center. An annular roller surrounds the cam body, the roller being rotatable relatively to the cam body and having an outwardly facing roller surface engageable with the opposing surface at a contact point. The cam body is rotatable about the offset axis to bring the roller surface into engagement with the opposing surface. The cam body is further rotatable relatively to the roller to forcibly engage the roller surface against the opposing surface in a self-locking manner.

The self-locking aspect is achieved by positioning the cam body center relatively to the offset axis such that a line of action passing through both the contact point and the cam body center initially passes to one side of the offset axis. This creates a first torque that resists rotation of the cam body about the offset axis in a direction moving the cam body into engagement with the opposing surface. The line of action moves upon further rotation of the cam body and passes to another side of the offset axis so as to create a second torque opposite the first torque. The second torque causes rotation of the cam body about the offset axis in a direction moving the cam body into engagement with the opposing surface. The second torque holds the roller surface in engagement with the opposing surface.

The invention also concerns a self-locking coupling for joining conduit ends together. The self-locking coupling comprises a first fitting having a concave surface facing radially outwardly from one end thereof. Another end of the first fitting is adapted for attachment to one of the conduit ends. A second fitting has a receptacle at one end adapted to coaxially receive the first fitting. Another end of the second fitting is adapted for attachment to another one of the conduit ends. A roller cam is mounted on the second fitting, the roller cam comprising a cam body having a center. The cam body is rotatable about an axis offset from the cam body center. The cam body is movable into and out of the receptacle upon rotation about the offset axis.

The roller cam further comprises an annular roller surrounding the cam body. The roller is rotatable relatively to the cam body and has an outwardly facing roller surface engageable with the concave surface at a contact point when the first fitting is received within the receptacle. The cam body is rotatable about the offset axis into the receptacle to bring the roller surface into engagement with the concave surface at the contact point. The cam body is further rotatable relatively to the roller to forcibly engage the roller surface with the concave surface in a self-locking manner and thereby retain the first fitting within the receptacle.

The self-locking aspect is achieved by positioning the cam body center relatively to the offset axis such that a line of action which passes through both the contact point and the cam body center upon engagement of the roller surface with the concave surface initially passes to one side of the offset axis. This line of action creates a first torque resisting rotation of the cam body about the offset axis in a direction moving the cam body into engagement with the concave surface. The line of action moves upon further rotation of the cam body and passes to another side of the offset axis so as to create a second torque opposite to the first torque. The second torque causes rotation of the cam body about the offset axis in a direction moving it into engagement with the concave surface. The second torque holds the roller surface in engagement with the concave surface thereby locking the first fitting into engagement with the second fitting.

It is an object of the invention to provide a self-locking cam.

It is another object of the invention to provide a self-locking cam having an annular roller surrounding the cam to reduce friction and actuation forces for the cam.

It is still another object of the invention to provide a self-locking cam which reduces wear between components moving relatively to one another.

It is yet another object of the invention to provide a self-locking cam useable in a coupling for connecting conduits such as hoses and piping.

It is again another object of the invention to provide a self-locking cam wherein a shifting line of action generates torques which hold the cam in a position of engagement with an opposing surface to create the self-locking characteristics.

These as well as other objects and advantages of the invention will become apparent upon consideration of the drawings and the description of the preferred embodiments.

DETAILED DESCRIPTION OF THE PREFERRED EMBODIMENTS

Figure 1:
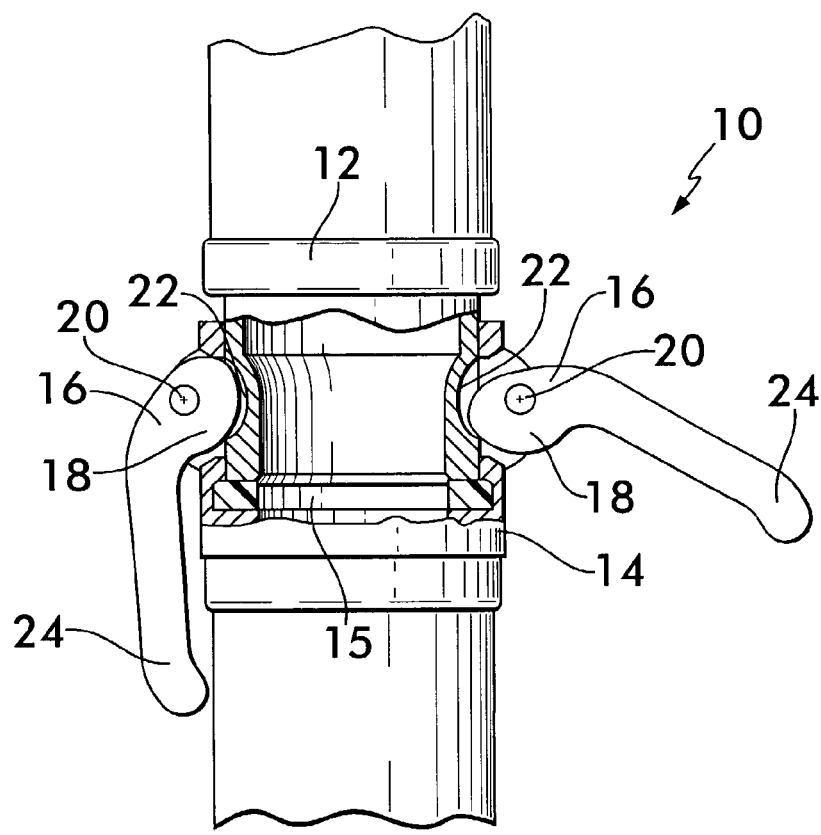
FIG. 1 is a partial sectional view of a mechanical pipe coupling using cams according to the prior art.
Figure 2A:
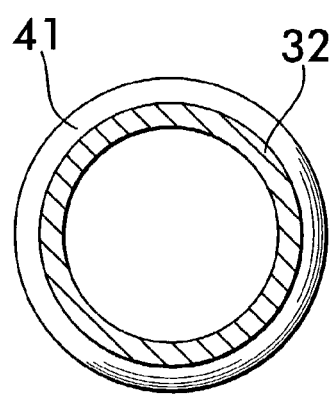
FIG. 2A is a cross-sectional view taken at line 2A of FIG. 2.
Figure 2:
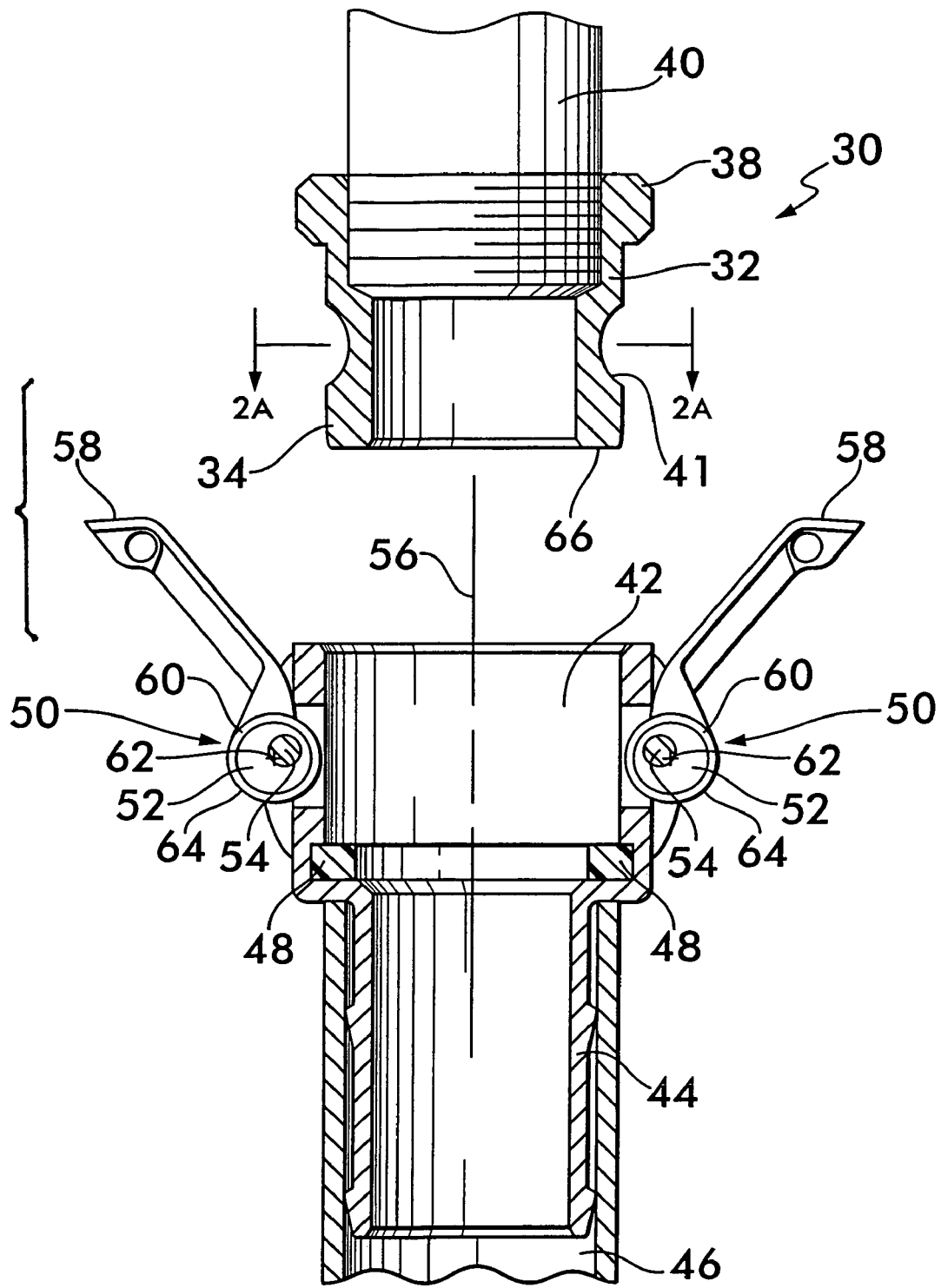
FIG. 2 is a sectional view of a mechanical pipe coupling using roller cams according to the invention.

FIG. 2 shows a pipe coupling 30 according to the invention. Pipe coupling 30 includes a male fitting 32 having an end 34 adapted to engage a female fitting 36 and an opposite end 38 attachable to a conduit, for example a pipe or hose end 40. Male fitting 32 is preferably substantially cylindrical in shape and has a concave surface 41 positioned in spaced relation to end 34. Concave surface 41 faces radially outwardly and preferably extends circumferentially around the fitting as shown in FIG. 2A.

Female fitting 36 has a receptacle 42 at one end adapted to receive the male fitting 32. The other end 44 of the female fitting 36 is adapted to attach to another conduit, such as pipe or hose end 46. Preferably, a seal 48 is positioned within receptacle 42, the seal engaging both the male and female fittings to ensure a fluid-tight joint. Seal 48 is preferably formed from a flexible, resilient material such as an elastomer. Male and female fittings 32 and 36 are preferably machined castings formed of a durable, high-strength metal such as aluminum, bronze, cast iron or steel. The fittings may also be formed of plastic such as polypropylene.

Figure 3:
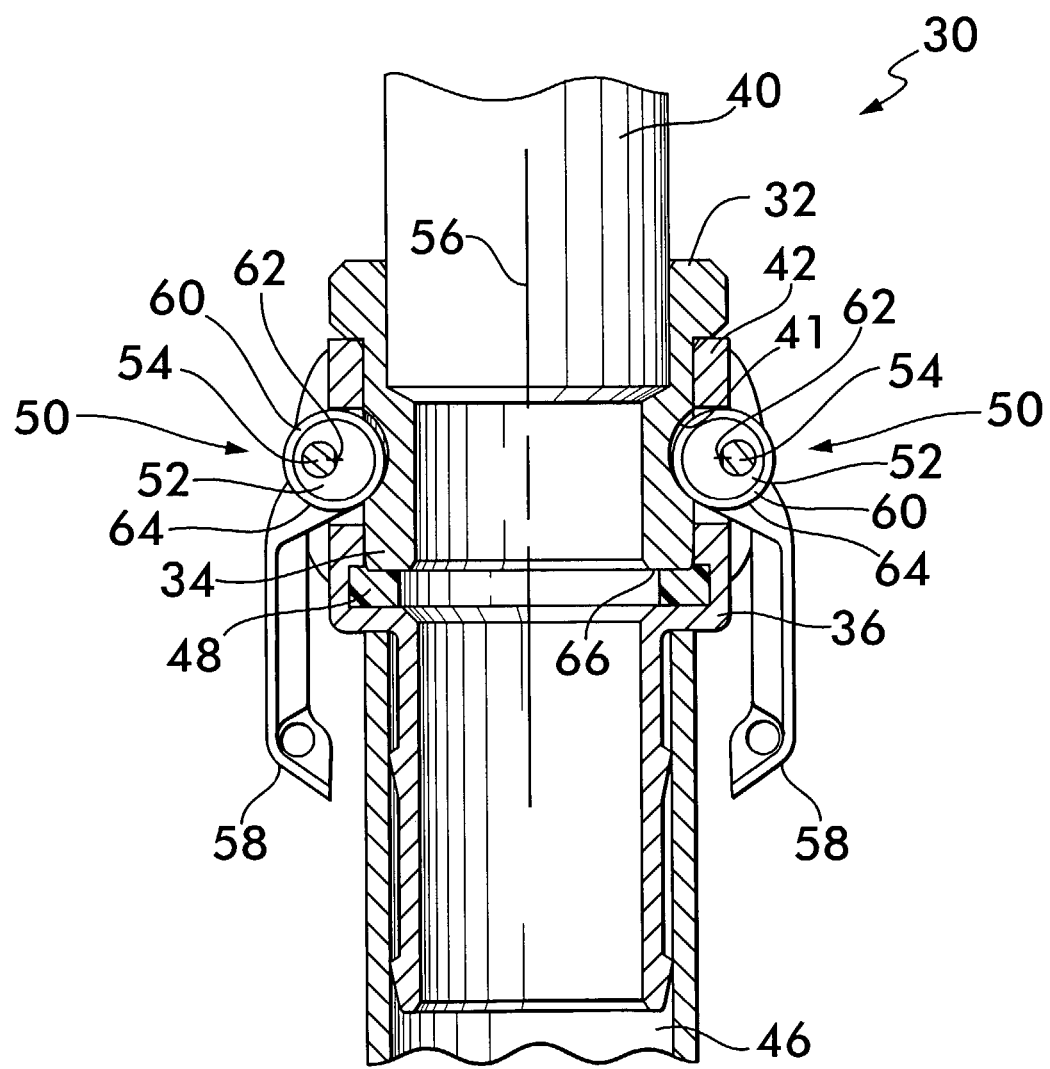
FIG. 3 is another sectional view of the mechanical pipe coupling shown in FIG. 2.

One or more self-locking roller cams 50 are mounted on the receptacle 42 of the female fitting 36. Roller cams 50 each have a cam body 52 that is preferably cylindrical and rotatable about an axis 54 offset from the center of the cam body. The offset axis of rotation 54 is oriented transversely to the long axis 56 of the female fitting 36. A respective lever arm 58 is attached to each cam body 52, the lever arm providing leverage for manually rotating the cam body about the offset axis 54. When cam bodies 52 rotate about their respective offset axes 54, they move from a position outside of the receptacle 42, as shown in FIG. 2, to a position within the receptacle, as shown in FIG. 3. This allows the self-locking roller cams 50 to engage the concave surface 41 of the male fitting, the surface 41 acting as an opposing surface to the roller cams 50 as described below.

An annular roller 60 surrounds each cam body 52. Roller 60 is rotatable relatively to the cam body 52 about the center 62 of the cam body. Roller 60 has an outwardly facing surface 64 that is engageable with the circumferential concave surface 41 of the male fitting 32.

To couple conduits such as pipe or hose ends 40 and 46 together in a fluid-tight joint, levers 58 are moved outwardly and away from the female fitting 36 to rotate the roller cams 50 about respective offset axes 54 and into the position shown in FIG. 2. This moves the cam bodies 52 out of the receptacle 42 and allows the male fitting 32 to be received within the receptacle so that its front face 66 may engage seal 48 as shown in FIG. 3. To secure the male fitting within the receptacle, levers 58 are moved inwardly and toward the female fitting 36 to the position shown in FIG. 3. The roller cams 50 rotate about respective offset axes 54 and position the cam bodies 52 within the receptacle 42. The outwardly facing surfaces 64 of the annular rollers 60 engage the concave surface 41 of the male fitting 32 as the cam bodies 52 are moved into the receptacle 42. Upon engagement with concave surface 41, the rollers 60 are fixed in rotation relatively to the concave surface by their contact with it, and the cam bodies 52 rotate relatively to the annular rollers 60 as the levers 58 are further moved to the fully closed position shown in FIG. 3. Allowing the cam bodies to rotate relatively to the rollers prevents relative motion between the concave surface 41 and the outwardly facing surfaces 64 of the of the rollers 60, thus, eliminating both friction and wear of these surfaces. Any friction and-wear occurs between the rollers 60 and their respective cam bodies 52 where the frictional forces and wear can be limited by lubricating and/or hardening the bearing surfaces between the rollers and the cam bodies. The relatively large surface area of the bearing surfaces between the rollers 60 and the cam bodies 52 lowers the contact stresses between the cam bodies and the rollers, further resulting in reduced wear and increased life of the coupling. Wear is further mitigated since the presence of abrasive contaminants between outwardly facing surface 64 and the concave surface 41 is no longer significant since there is no relative motion between them. The reduced friction and wear between the relatively moving parts also causes a reduction in the force needed to move the levers 58 between the open and closed positions of FIGS. 2 and 3.

Figure 4:
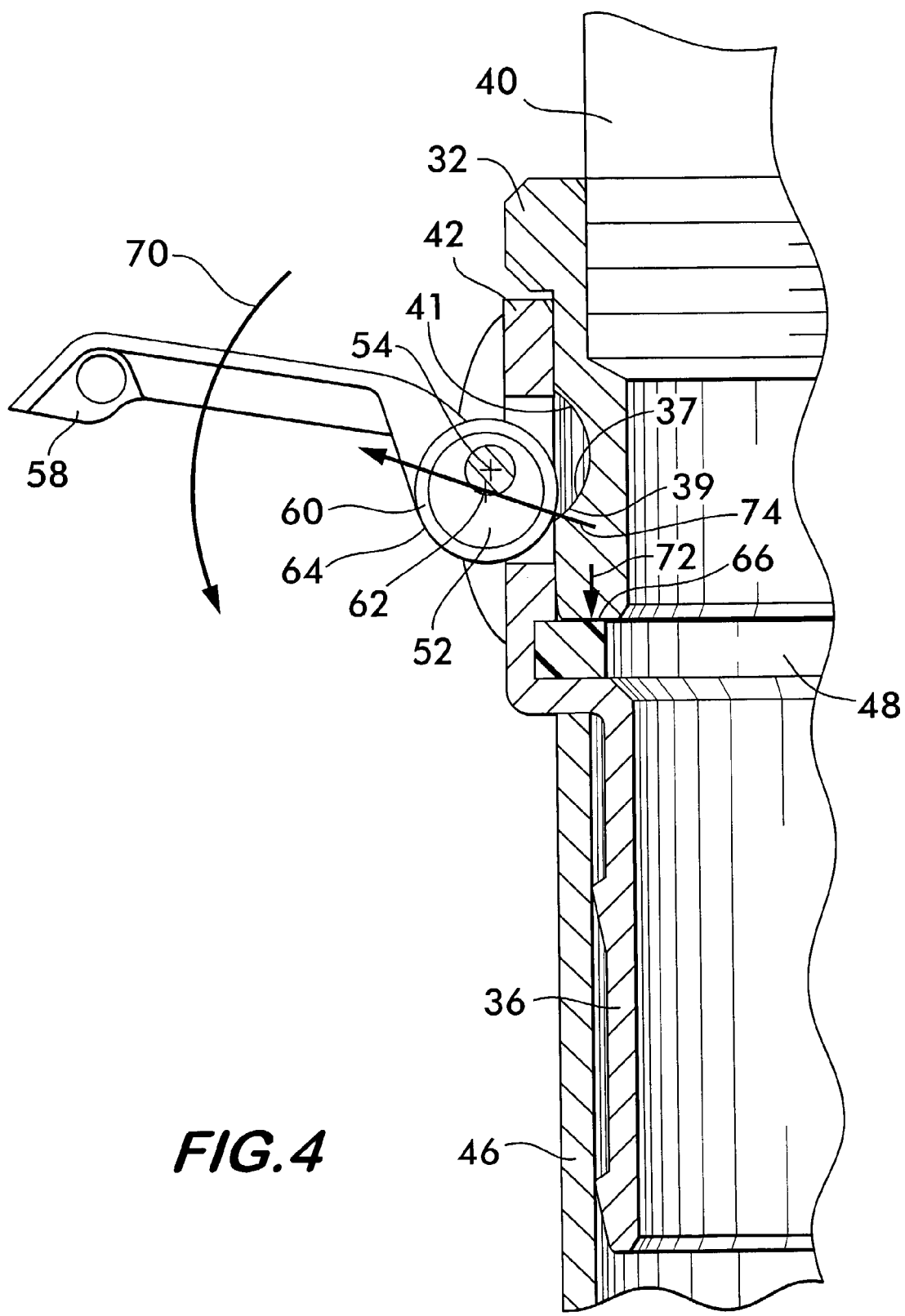
FIGS. 4 and 5 are detailed partial sectional views on an enlarged scale of the mechanical pipe coupling in FIGS. 2 and 3 showing the lines of action of forces affecting the roller cams during rotation of the cams.
Figure 5:
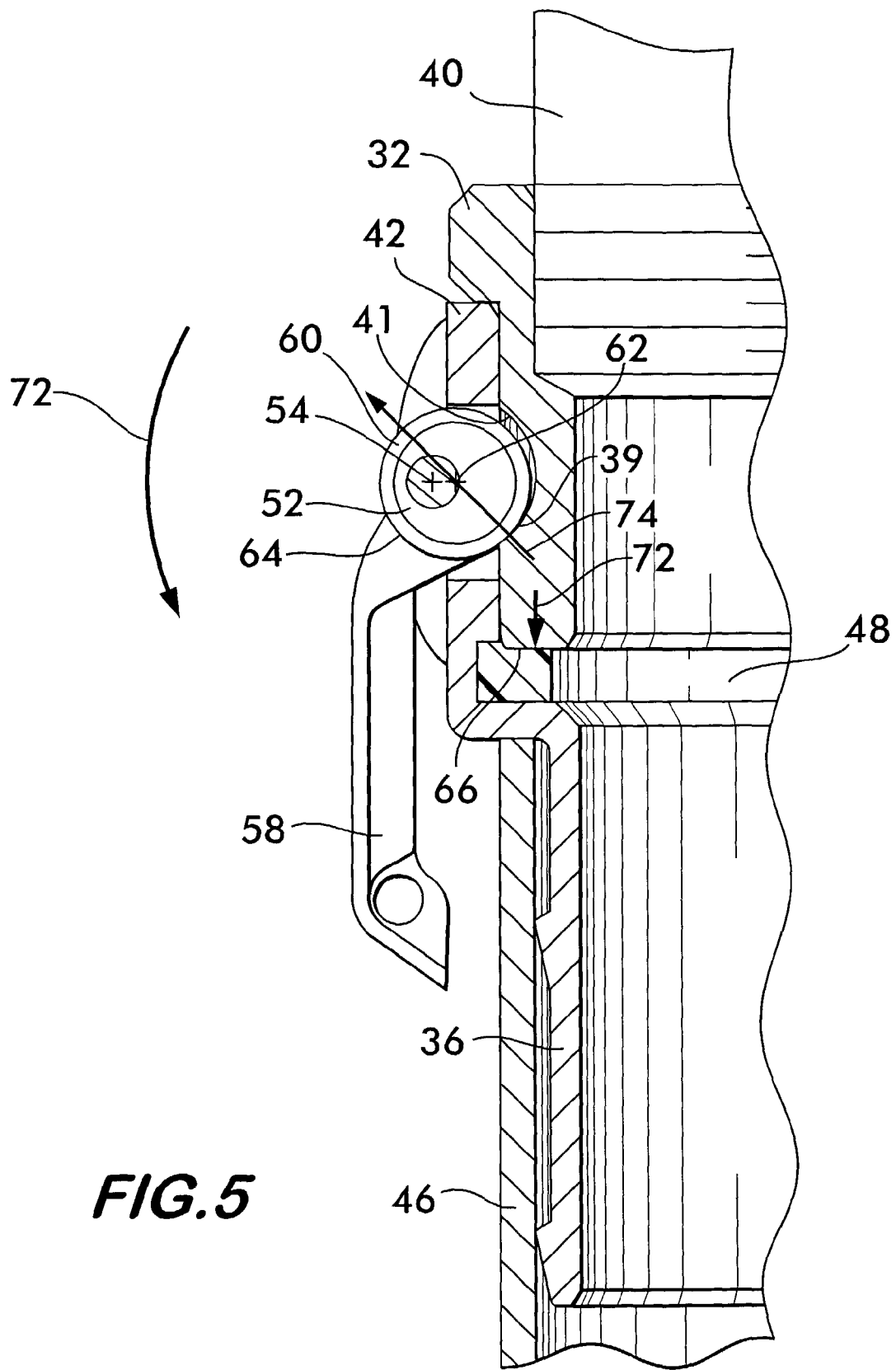

Details of the self-locking characteristics of the coupling are illustrated in FIGS. 4 and 5. The description provided below addresses only one roller cam, it being understood that the same description of operation applies to each roller cam present on the coupling.

As shown in FIG. 4, male fitting 32 is received within receptacle 42 of the female fitting 36 and lever 58 is moved in a counterclockwise manner toward the female fitting as indicated by arrow 70. Motion of the lever 58 rotates the cam body 52 about offset axis 54 and into the receptacle 42, the outwardly facing surface 64 of roller 60 engaging the concave surface 41 of the male fitting 32 at a contact point 39, initially positioned adjacent to a leading edge 37 of the concave surface 41. During the phase of operation shown in FIG. 4, the front face 66 of male fitting 32 is forced against seal 48 (as shown by arrow 72) by the interaction of the roller 60 with the concave surface 41 at the contact point 39. The interaction of outwardly facing surface 64 with concave surface 41 as well as compression of the male fitting 32 against the seal 48 results in a reaction force occurring along a line of action 74 that passes through the contact point 39 and the center 62 of cam body 52 and to one side of offset axis 54. This creates a torque that resists the counterclockwise motion of the lever 58. As the lever 58 is moved further counterclockwise, the contact point 39 between outwardly facing surface 64 of roller 60 and concave surface 41 moves upwardly along the concave surface, causing increased compression of the seal 48. The reaction force increases with increased compression of seal 48, but the torque resisting the counterclockwise motion of the lever 58 reaches a maximum and then decreases as the line of action 74 passes through the offset axis 54 due to the reorienting of the line of action 74 caused by the changing position of the cam body center 62 and the contact point 39 relative to the offset axis 54. This is the point of maximum seal compression. Further counterclockwise rotation of the cam body 52 places the line of action 74 on the opposite side of offset axis 54 as shown in FIG. 5, relieving a small portion of the seal compression. In this configuration, the reaction force operating along the line of action 74 due to the interaction of outwardly facing surface 64 with concave surface 41 as well as the compression of seal 48 now produces a torque that operates to move lever 58 in a counterclockwise sense as shown by arrow 76. This torque tends to hold the lever in the closed position shown in FIG. 5, thereby providing the self-locking feature that retains the male fitting 32 within the receptacle 42. The torque increases with increasing pressure within the fitting, as any force tending to move the male fitting 32 out of the receptacle 42 increases the counterclockwise torque and thereby holds the lever 58 in the closed position all the more tightly. This prevents the coupling from opening inadvertently when subject to a shock when under pressure.

It should be noted that the self-locking action is not specifically dependent upon the presence of seal 48, but occurs as a result of the interaction between the outwardly facing surface 64 of cam 50 and the opposing surface provided by the concave surface 41 of the male fitting 12. The self-locking action is augmented whenever the front face 66 is compressed against some surface within the receptacle 42, or internal pressure within the coupling is present which would tend to force the male and female fittings apart so that a reaction force between the concave surface 41 and the cam 50 having line of action 74 is created.

Figure 6:
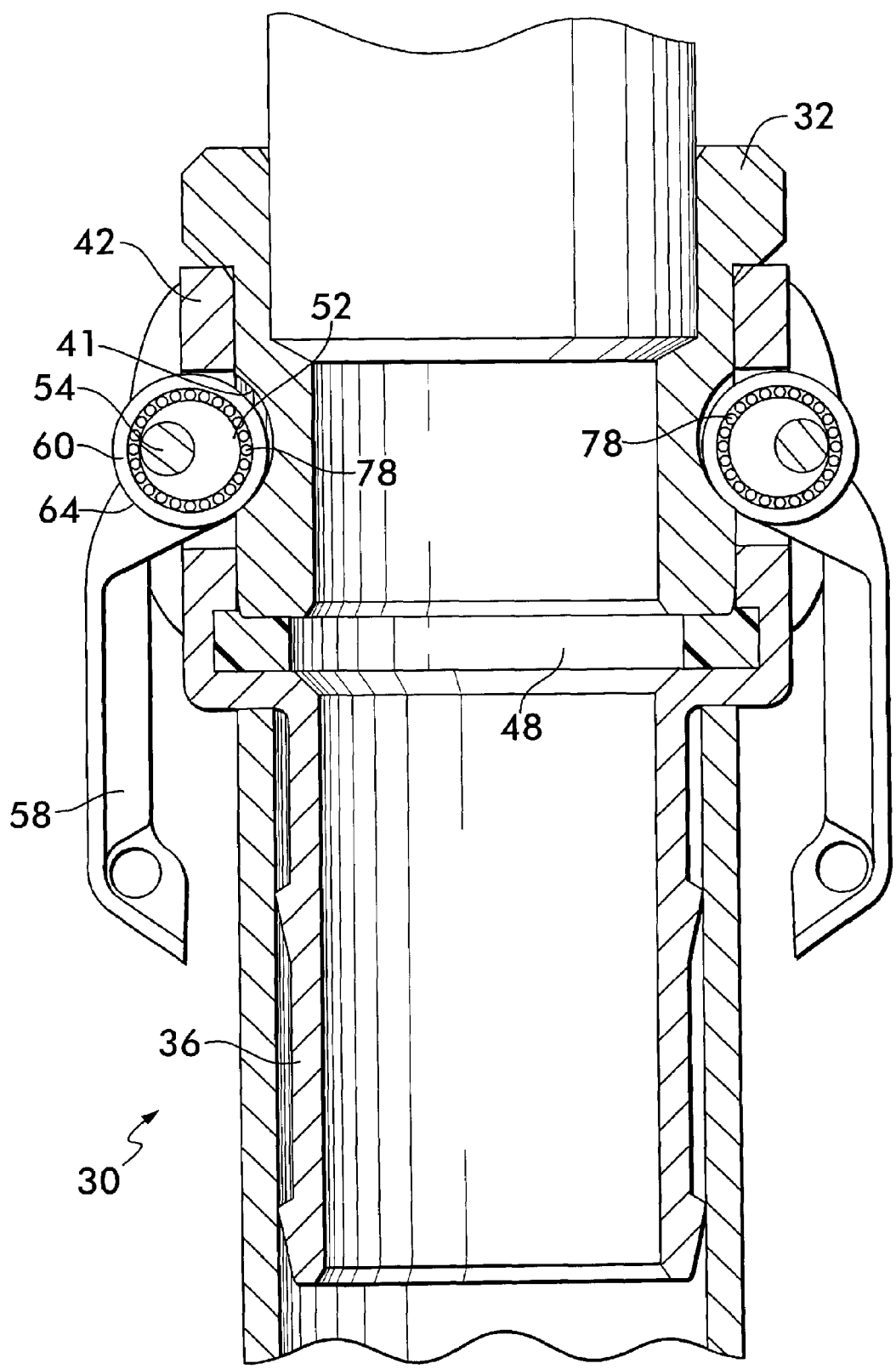
FIG. 6 is an alternate embodiment of the mechanical pipe coupling according to the invention.

FIG. 6 shows an alternate embodiment of a coupling 30 according to the invention, there being roller or ball bearings 78 between the rollers 60 and the cam bodies 52 to further reduce friction between the relatively moving parts.

Self-locking pipe couplings having roller cams according to the invention have reduced friction between the relatively moving parts. This is advantageous because wear is reduced and the forces needed to move the levers that rotate the cams to effect a fluid-tight coupling are also reduced. Less wear means the coupling will last longer. Lower force required to actuate the levers means that higher seal compression forces may be achieved while still allowing for manual lever actuation, thus allowing the couplings to withstand higher internal pressures without leaking. Lower lever forces also result in easier assembly of couplings in the field The self-locking feature ensures a reliable, fluid-tight joint without the need for additional mechanisms to hold the cams in the closed position and avoid inadvertent release of the fittings.

What is claimed is:

1. A self-locking coupling for joining conduit ends together, said self-locking coupling comprising:
    a first fitting having a concave surface facing radially outwardly from one end thereof; another end of said first fitting being adapted for attachment to one of the conduit ends;
    a second fitting having a receptacle at one end adapted to coaxially receive said first fitting, another end of said second fitting being adapted for attachment to another one of the conduit ends;
    a roller cam mounted on said second fitting, said roller cam comprising a cam body having a center, said cam body being rotatable about an axis offset from said cam body center, said cam body being movable into and out of said receptacle upon rotation about said offset axis;
    said roller cam further comprising an annular roller surrounding said cam body, said roller being rotatable relatively to said cam body, said roller having an outwardly facing roller surface engageable with said concave surface at a contact point when said first fitting is received within said receptacle, said cam body being rotatable about said offset axis into said receptacle to bring said roller surface into engagement with said concave surface at said contact point, a line of action passing through both said contact point and said cam body center upon engagement of said roller surface with said concave surface, said cam body center being positioned relatively to said offset axis such that said line of action initially passes to one side of said offset axis so as to create a first torque resisting rotation of said cam body about said offset axis into engagement with said concave surface, said line of action moving upon further rotation of said cam body and passing to another side of said offset axis so as to create a second torque opposite to said first torque and causing rotation of said cam body about said offset axis into engagement with said concave surface, said second torque holding said roller surface in engagement with said concave surface thereby locking said first fitting into engagement with said second fitting.

2. A self-locking coupling according to claim 1, wherein said first and second fittings are substantially cylindrical in shape.

3. A self-locking coupling according to claim 2, wherein said concave surface extends circumferentially around said first fitting.

4. A self-locking coupling according to claim 1, wherein said cam body is substantially cylindrical in shape.

5. A self-locking coupling according to claim 1, wherein said roller is substantially cylindrical in shape.

6. A self-locking coupling according to claim 1, further comprising a plurality of rolling bearings positioned between said cam body and said roller.

7. A self-locking coupling according to claim 6, wherein said rolling bearings comprise ball bearings.

8. A self-locking coupling according to claim 1, further comprising a lever arm attached to said cam body and extending outwardly from said receptacle, said lever arm providing leverage for manually rotating said roller cam about said offset axis.

9. A self-locking coupling according to claim 8, wherein said lever arm is positioned relative to said cam such that rotation of said lever arm about said offset axis toward said second fitting causes said roller cam to move into said receptacle, and rotation of said lever arm away from said second fitting causes said roller cam to move out of said receptacle.

10. A self-locking coupling according to claim 1, further comprising a second roller cam mounted on said second fitting substantially diametrically opposite to said first roller cam.

* * * * *